United States Patent
Wang

(10) Patent No.: US 6,403,254 B1
(45) Date of Patent: Jun. 11, 2002

(54) BATTERY MEANS FOR HAND HELD ELECTRONIC DEVICES

(75) Inventor: Ching-Yuan Wang, Taipei (TW)

(73) Assignee: TelePaq Technology Inc. (TW)

( * ) Notice: Subject to any disclaimer, the term of this patent is extended or adjusted under 35 U.S.C. 154(b) by 0 days.

(21) Appl. No.: 09/369,328

(22) Filed: Aug. 6, 1999

(30) Foreign Application Priority Data

Oct. 21, 1998 (TW) ........................... 87217335 U

(51) Int. Cl.[7] ............................................ H01M 10/38
(52) U.S. Cl. ....................... 429/123; 429/96; 429/97; 429/98; 429/100; 429/121; 429/122
(58) Field of Search .......................... 429/61, 90, 96, 429/97, 98, 99, 100, 121, 122, 123

(56) References Cited

U.S. PATENT DOCUMENTS

| | | | |
|---|---|---|---|
| 5,065,745 A | * | 11/1991 | Meier .................... 128/205.12 |
| 5,607,791 A | * | 3/1997 | Garcia et al. .................. 429/96 |
| 6,051,334 A | * | 4/2000 | Tsurumaru et al. ........... 429/97 |
| 6,120,932 A | * | 9/2000 | Slipy et al. .................... 429/99 |

\* cited by examiner

*Primary Examiner*—Carol Chaney
*Assistant Examiner*—Dah-Wei D. Yuan
(74) *Attorney, Agent, or Firm*—Troxell Law Office PLLC

(57) ABSTRACT

A battery means for hand held electronic devices includes a device body with an elongated chamber which has an end opening and an elongated flange means, and an elongated battery packet moveable in the chamber through the end opening and is able to nest in the chamber securely because of the elongated flange means. The battery packet is an independent and self-contained unit houses a battery inside. The battery packet has a plurality of second contacts to couple with the battery and to engage with a plurality of first contacts located in the chamber to transmit electric power.

5 Claims, 7 Drawing Sheets

BATTERY MEANS FOR HAND HELD ELECTRONIC DEVICES

BACKGROUND OF THE INVENTION

1. Field of the Invention

This invention relates to a battery means for hand held electronic devices particularly to a self-contained battery packet for ordinary non-rechargeable and rechargeable battery that is able to fit securely at small size in a hand held electronic device.

2. Description of the Prior Art

Because of flourishing business development and technology innovation, a great number of portable and small size electronic devices and appliances have been introduced in the marketplace in recent years, such as cellular phone (also named as mobile phone), palm size Personal Digital Assistant (PDA), Pager, electronic dictionary, electronic game set, wireless phone, hand held personal computer, walkman cassette player, calculator and the like. The theme of design for these devices mainly aims at small size, light weight, attractive appearance, high reliability and good value. Most of these devices also are powered by battery. FIGS. 1A and 1B show a typical PDA as an example. The PDA 1 has a battery chamber 2 located at a lateral side (usually near the bottom) for housing one or more batteries 3. The batteries 3 are protected and held in the battery chamber 3 by a base cover 4 which has a snap hook 5 engageable with a notch slot 6. The engagement between the snap hook 5 and the notch slot 6 is not reliable because of relatively small size and short length of the hook 5 and slot 6. Pushing the base cover 4 lightly or an accidental drop of the PDA 1 could disengage the base cover 4 from the PDA 1. The batteries 3 could easily get loose and dropping out of the chamber 2. When the batteries 3 have been held in the chamber 2 for a long time and aged, and results in battery liquid seeping out, it could cause corrosion of the PDA circuits and making the PDA break down. The design of such battery means also looks cheap without high value.

FIG. 1B shows another conventional PDA 7 which uses a non-standard rechargeable battery 8. The battery 8 is held in the PDA 7 by latching means 9 and has a plurality (usually four) of first electric contacts 11 coupleable with second electric contacts 10 located on the PDA. The latching means 9 still is not a reliable structure and easily results in the battery 8 breaking loose from the PDA under external force. The battery 8 is also relatively bulky and making the whole PDA become too thick and heavy.

There is another disadvantage for conventional battery means used in a PDA shown in FIGS. 1A and 1B, i.e., standard battery is not interchangeable with non-standard rechargeable battery. For instance, the PDA 7 shown in FIG. 1B cannot use standard battery. While a special transformer may be provided for recharging the rechargeable battery 8, the rechargeable battery 8 is limited to a small range of specifications and is quite expensive.

SUMMARY OF THE INVENTION

In view of aforesaid disadvantages, it is therefore an object of this invention to provide a detachable and self-contained battery packet for hand held electronic devices that is more reliable, easy to use, applicable to standard battery and rechargeable battery and looks more sightly.

A preferred embodiment of the hand held electronic device having a battery means according to this invention includes a device body, an independent and detachable battery packet, at least one button and a control unit. The button and the control unit are located in the device body which further has an elongated battery chamber located in a lateral side for holding the battery packet.

The battery packet has a case to hold one or more standard non-rechargeable batteries or a non-standard rechargeable battery. The battery chamber has a lengthy flange to hold the battery packet securely therein without getting loose. The battery packet further has a plurality of electric contacts to couple with another set of electric contacts located in the battery chamber for electric transmission. The battery packet is a separated and detachable member and may be replaced whenever desired. The hazard of battery liquid contamination to the electronic device is thus greatly reduced. The battery packet may be made small size to match the electronic device. It looks more sightly and provides greater value.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
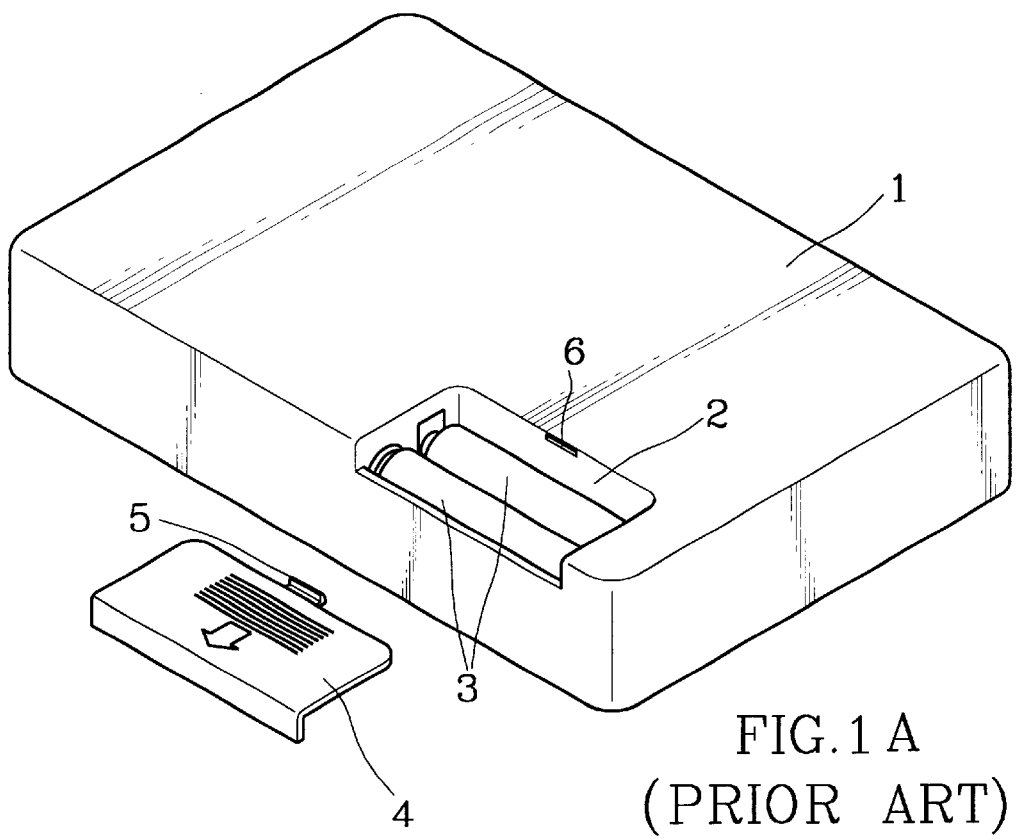
FIGS. 1A and 1B are perspective views of two different conventional Personal Digital Assistants (PDA) that use different types of battery.
Figure 1:
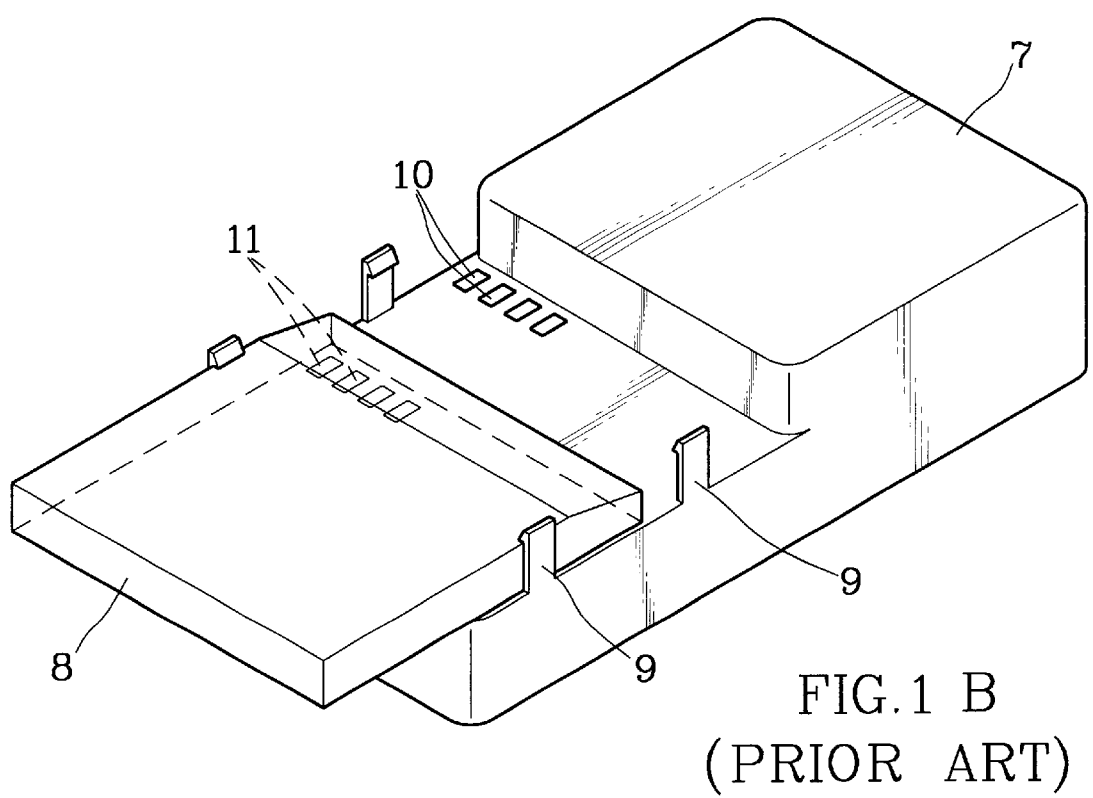
Figure 2:
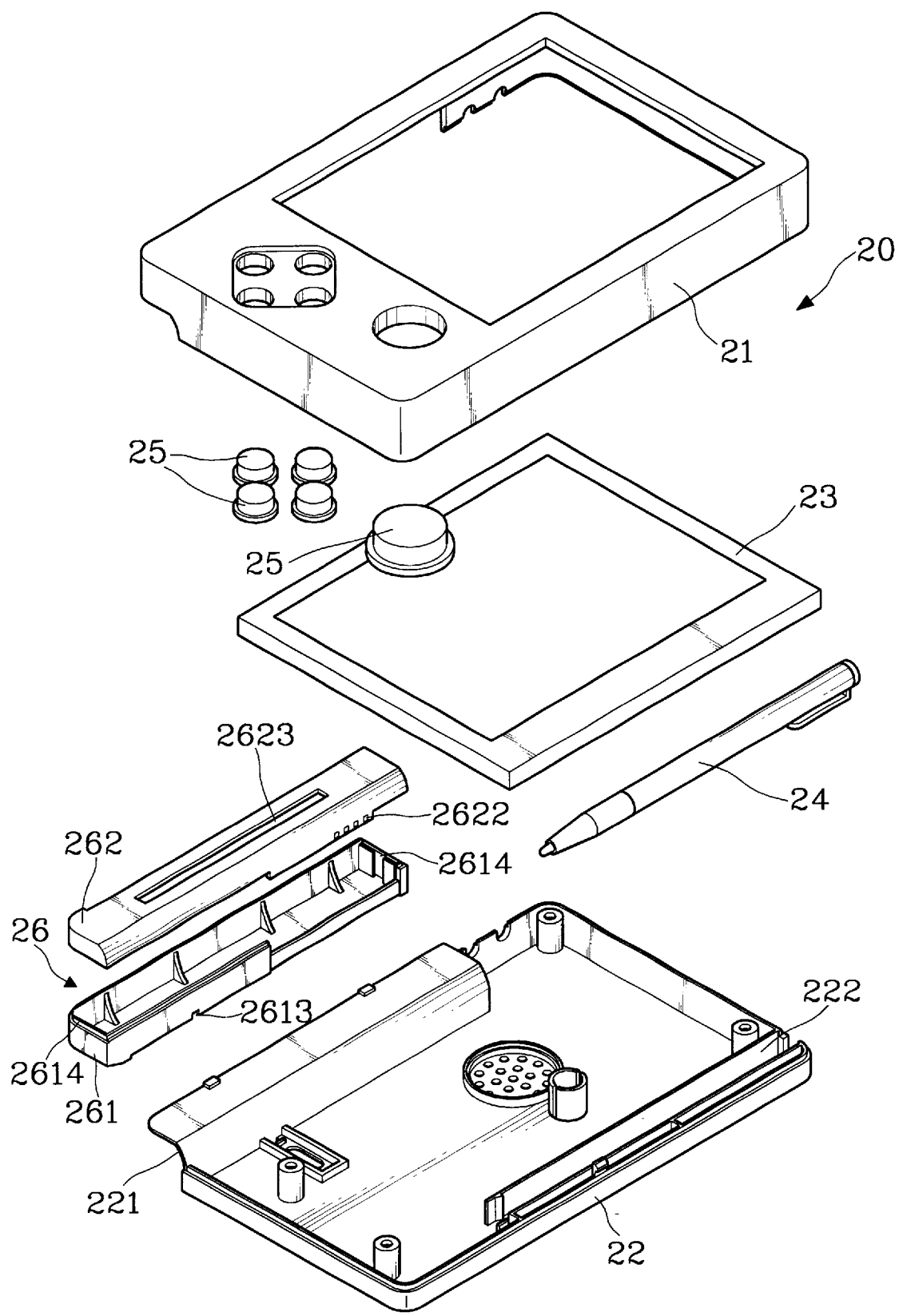
FIG. 2 is an exploded perspective view of a PDA using a battery means of this invention.
Figure 3:
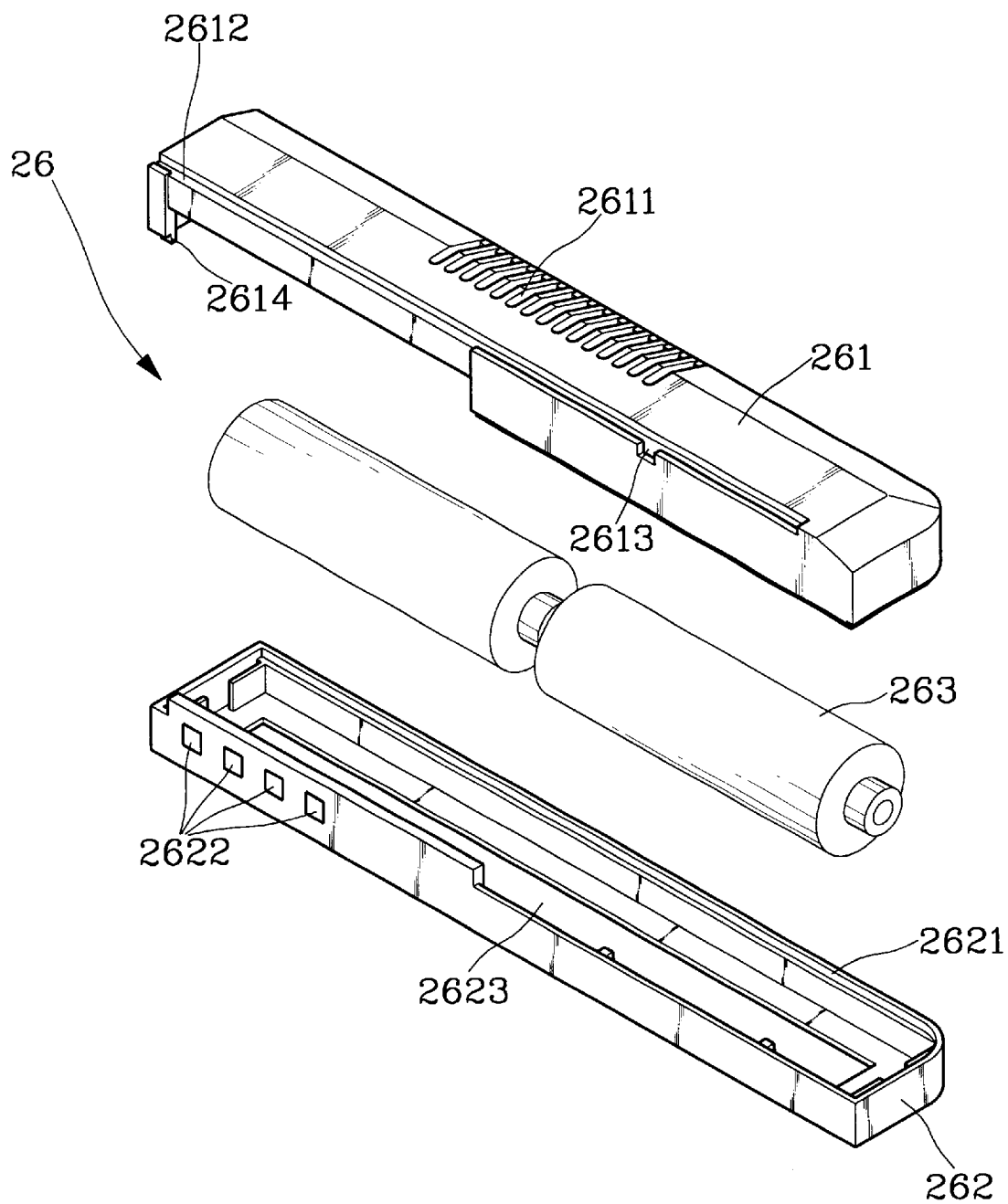
FIG. 3 is an exploded perspective view of a battery packet of this invention.
Figure 4:
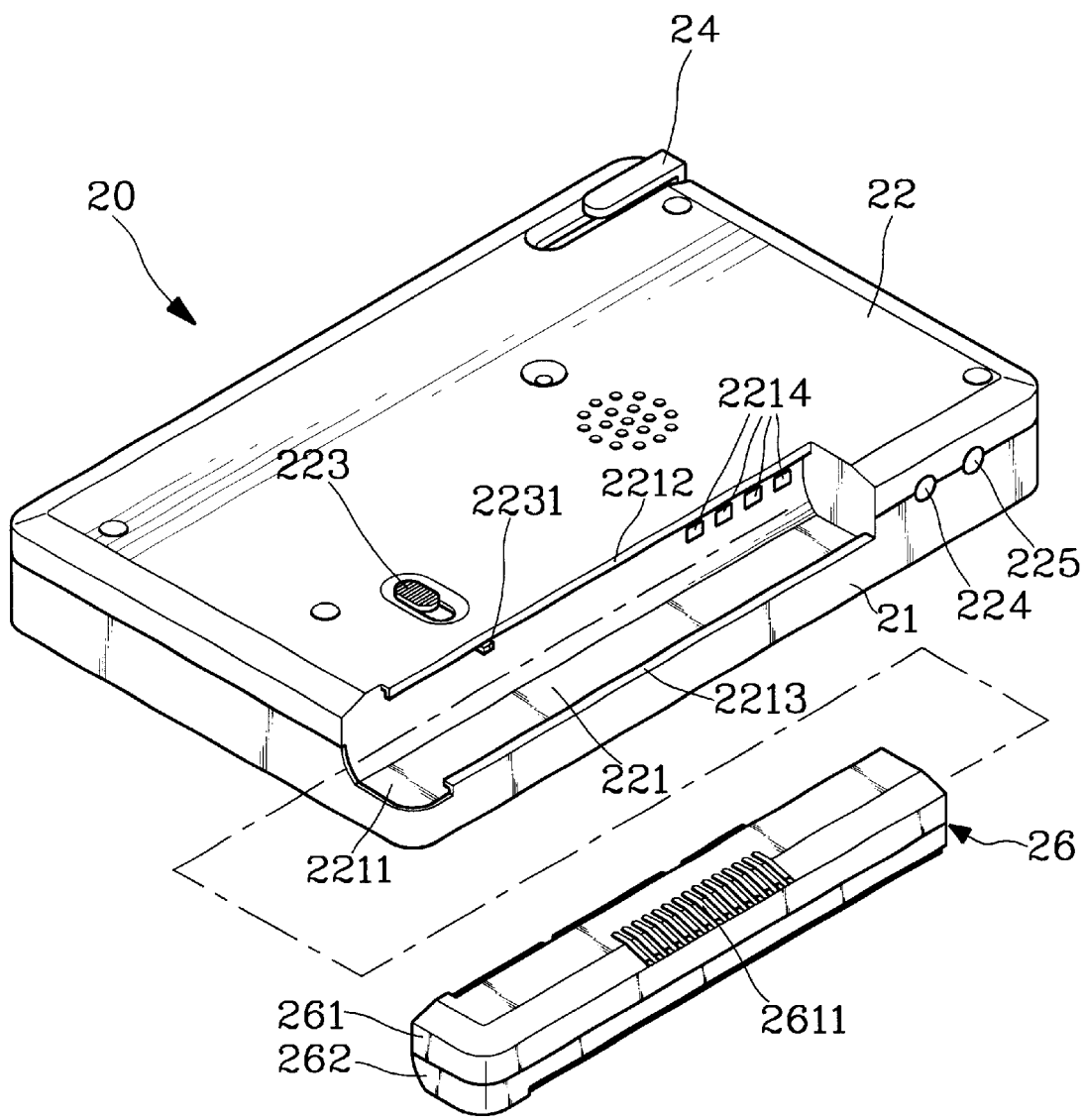
FIG. 4 is a perspective view of a PDA and a battery packet at a separated state.

FIGS. 2, 3 and 4 illustrate a preferable embodiment of this invention which is used with a PDA 20. It is to be understood, this invention may apply equally well to other portable and hand held electronic devices such as beehive type cellular phone, household wireless phone, paper, electronic game set, electronic dictionary, walkman cassette player, PDA, camera (conventional or digital), electronic calculator.

The PDA 20 includes a device body and a battery packet 26. The device body includes a first case 21 and a second case 22 to form a space therebetween to house a sensor blard (or display) 23, a stylus 24, a plurality of buttons 25, a control unit (not shown in the figures) and a chamber 221. The first case 21 further has a plurality of openings (unmarked) to hold and expose the buttons 25 and the sensor board 23 for users access. The second case 22 has the chamber 221 for housing the battery packet 26 and a pen slot 222 for housing the stylus 24. The stylus 24 may be used to touch or write on the sensor board 23 to produce required instructions and data for the PDA to process or display on the sensor board. The device body further has a signal port 224 for wiring to a PC or other device, and a power port 225 engageable with a DC transformer (not shown in the figures) for connecting to a power supply such as a city power outlet.

The battery packet 26 includes an upper case 262 and a lower case 261 to house a battery 263 therebetween. The lower case 261 has a latching flange 2614 engageable with a latching groove 2621 formed on the upper case 262. The lower case further has a plurality of gripping grooves 2611 formed on an outside surface to facilitate moving the battery packet 26 in or out of the PDA 20.

The chamber 221 is an elongated cavity located in a lateral side of the second case 22 and has an end opening 2211 to allow the battery packet 26 to be inserted into or be removed from the chamber 221 easily. The chamber 221 has a pair of spaced flanges 2212 and 2213 located respectively at two edges thereof to serve as guide for engaging with a pair of grooves 2612 formed at two bottom edges of the lower case 261 to make the engagement of the battery packet smooth and secured. Once the battery packet 26 is nested in the chamber 221, it has three sides making contact with the PDA while other three sides are exposed to outside. The battery packet 26 eventually looks like an integral part of the PDA from outside appearance. It makes the whole PDA set smooth, neat, compact, and looks more appealing and gives higher value image. It also reduces case material needed. The upper case 262 has a slot opening 2623 for viewing readily if the battery 263 is a standard type or a non-standard rechargeable type. The slot opening 2623 may be formed with a curved entrance so that a standard barrel shaped battery may be inserted therethrough into the battery packet 26 without even opening the upper case 262 from the lower case 261. Of course the battery packet 26 may be also dispensed with the slot opening 2623.

FIG. 3 illustrates that two standard AAA (or 3A) type 1.5 V non-rechargeable batteries are used in this embodiment. Of course many other types of battery, such as 1.2V or 3V rechargeable type battery, or different number of other standard non-rechargeable batteries may be used equally well in this invention. Since the battery packet 26 is an independent and detachable unit, it may be removed and replaced easily without affecting other part of the PDA. Therefore the risk or battery liquid contamination resulting from broken or aged battery is greatly lowered.

Between the contact surface of the chamber 221 and the battery packet 26, there may be provided respectively with a plurality of electric contacts 2214 and 2622 mating and coupling with each other to establish electrical connection. The number of the contacts may be varied as desired. The location and arrangement of the contacts may also be changed as desired such as one row or two rows on a lateral side or of an end side of the chamber 221 and the battery packet 26.

In a preferred embodiment shown in FIGS. 3 and 4, the contacts 2622 may include a sensor contact, a current contact and two power contacts connecting respectively to the battery 263 (whether non-rechargeable or rechargeable) at positive and negative poles. The sensor contact may be wired to a control circuit for identifying if the battery is a rechargeable or non-rechargeable one. The current contact in use to show the charging level of the rechargeable battery. When the power port 225 is wired to a city power outlet and the sensor contact identifies the battery 263 is a rechargeable one, recharging of the battery 263 is automatically taking place until the current contact senses that the charging level reaches the high limit. Of course there is no recharging taking place if the battery 263 is a standard non-recharging type.

Figure 5:
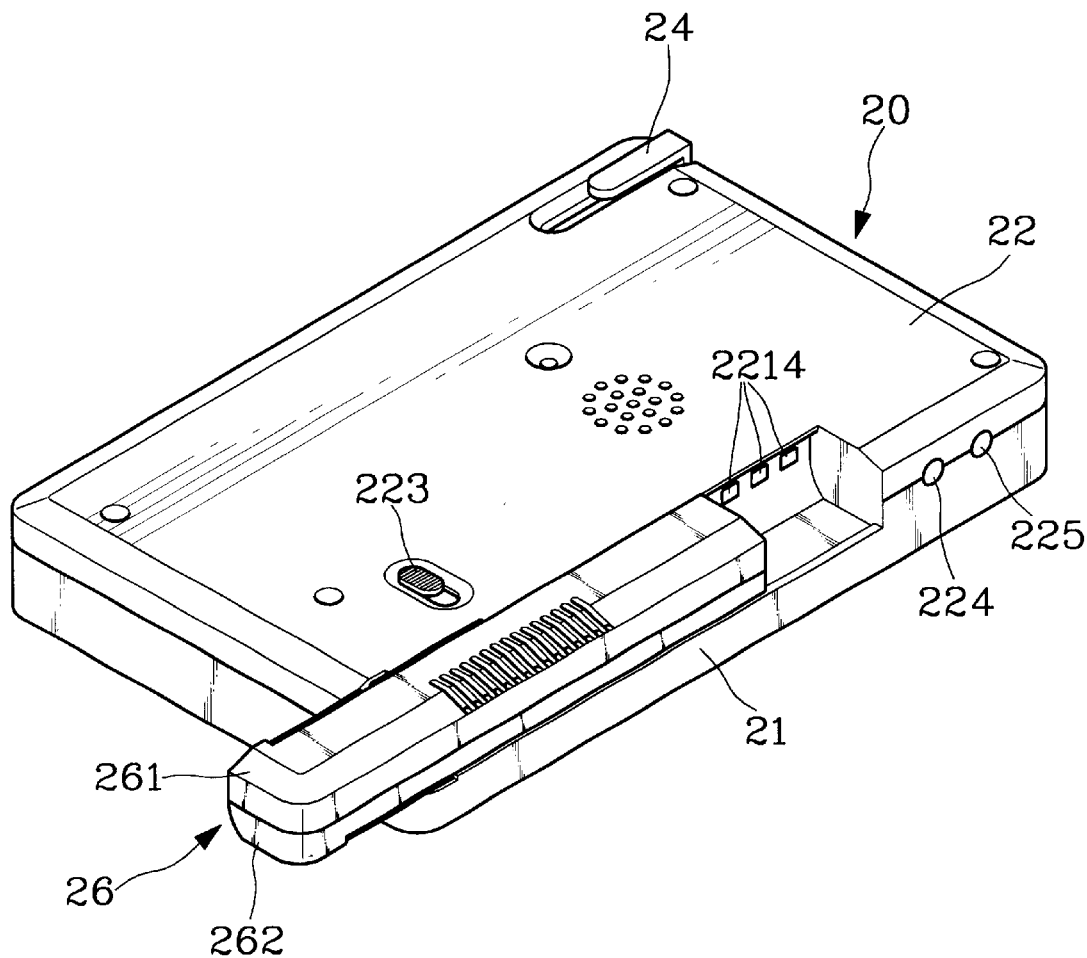
FIG. 5 is a perspective view of a PDA and a battery packet at a partly assembled state.

FIGS. 4 and 5 further show a locking feature for holding the battery packet 26 securely in the chamber 221 even under external force such as accidental dropping of the PDA. In the second case 22, there is provided with a latch button 223 which has a latch hook 2231 extending to the chamber 221. On the lower case 261 there is a notch 2613 engageable with the latch hook 2231. When the battery packet 26 is nested in the chamber 221 and with the latch button 223 pushed to move the latch hook 2231 engaged with the notch 2613, the battery packet 26 is locked in the chamber 221 without the risk of getting loose away from the PDA.

The following offers more embodiments of this invention. Like components will be marked by like numerals with an affixed character.

Figure 6:
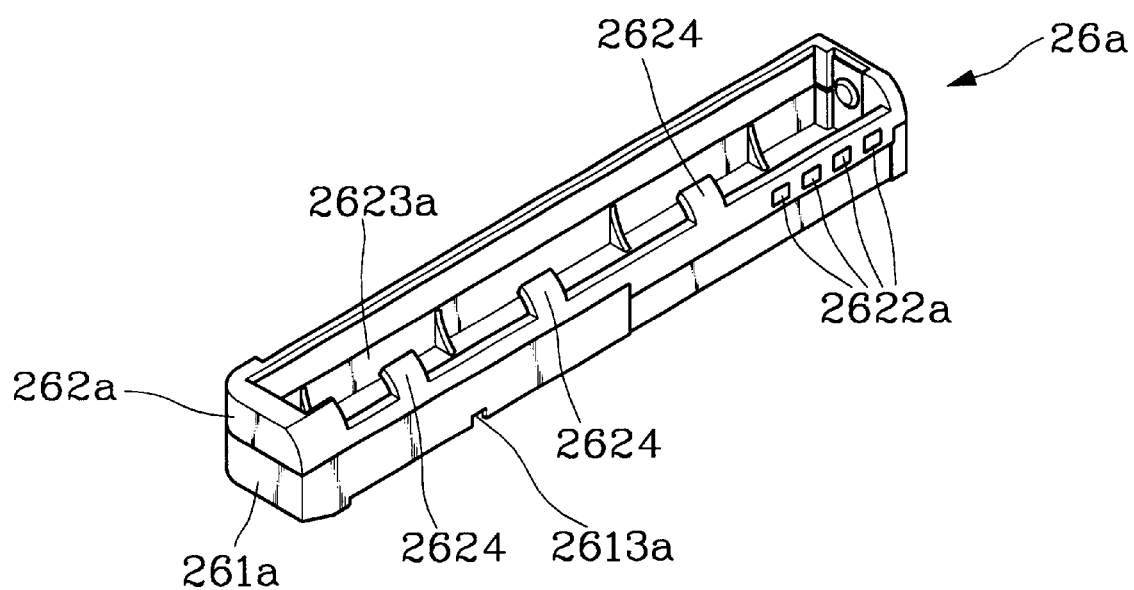
FIG. 6 is a perspective view of another embodiment of the battery packet of this invention.

FIG. 6 illustrates another embodiment. The battery packet 26a is for holding a standard non-rechargeable battery. It is mostly constructed like the one shown in FIG. 3. It also has two cases 261a and 262a, and other features such as gripping grooves (not shown), latching flange and groove (not shown), latching notch 2613a, electric contacts 2622a, and slot opening 2623a. However the slot opening 2623a in the upper case 262a has been enlarged to slightly smaller than the standard battery so that the battery may be inserted into the battery packet 26a through the slot opening 2623a by force without separating the lower case 261a from the upper case 262a. The upper case 262a has a plurality of latch claws 2624 extending over the slot opening 2623a to prevent the battery held in the battery packet from dropping out. Such structure allows the upper and lower cases 262a and 261a be fused together (by heated welding, ultrasonic welding, gluing or other binding means known in the art). It enables the placing and removing of the battery without opening the cases, and thus is more convenient to use and more reliable.

Figure 7:
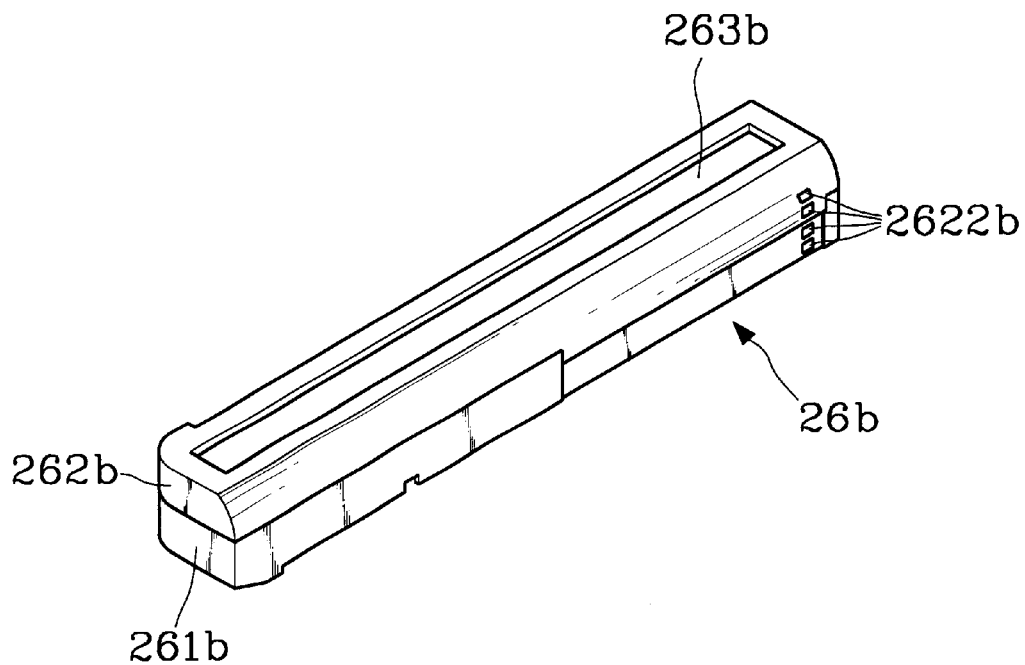
FIG. 7 is a perspective view of a further embodiment of the battery packet of this invention.

FIG. 7 illustrates a further embodiment which uses a rechargeable battery 263b. It also has two cases 262b and 261b fused together like the one shown in FIG. 6. Electric contacts 2622b may be disposed on an end of the packet as desired.

Figure 8:
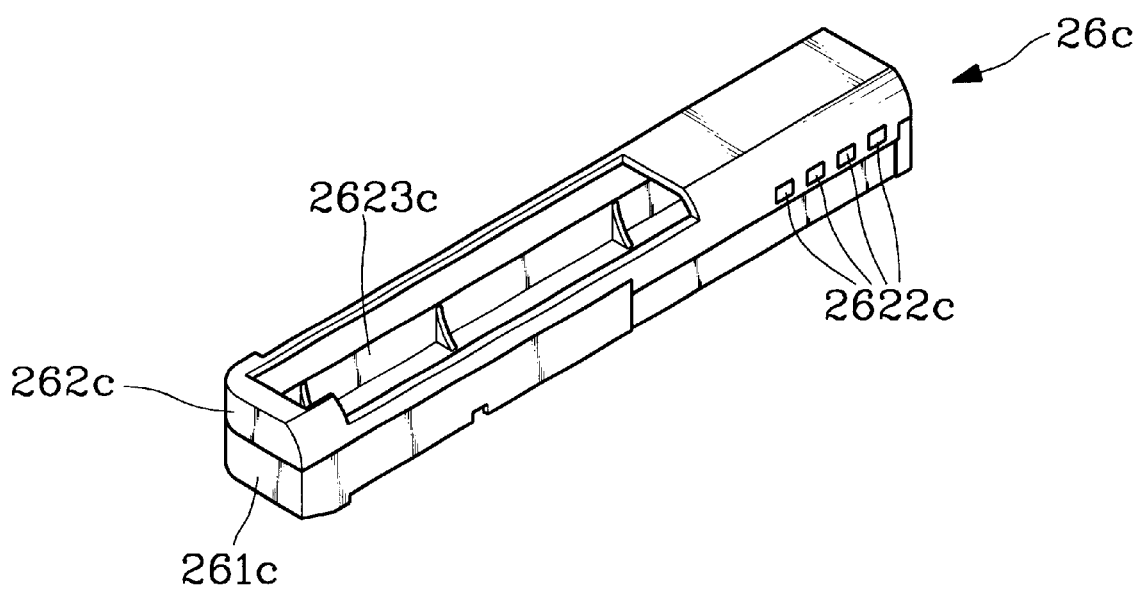
FIG. 8 is a perspective view of still another embodiment of the battery packet of this invention.

FIG. 8 shows another embodiment which has a semi-opening structure. The battery packet 26c has a slot opening 2623c which covers about a half of the upper case 262c so that a standard battery may be inserted into the packet one by one to form a serial connection.

In summary, this invention offers the following advantages:

1. Battery 263 (standard or non-standard re-chargeable or non-rechargeable type) is held in the battery packet 26 which consists of two cases 261 and 262 to form an independent and detachable unit. It looks more appealing and has a high value appearance. It also offers better protection against battery liquid contamination or corrosion resulting from aged or broken battery which might otherwise damage the device body where the battery packet being nested.

2. The engageament between the elongated flange 2212 and 2213 with the groove 2612 of the battery packet 26 is much stronger than conventional snap hook and notch slot. The provision of latch button 223, latch hook 2231 and notch 2613 further improve the reliability of engagement that may hold the battery packet 26 securely in the device body even under heavy external force such as incidental dropping of the device body.

3. This invention may be easily adapted to hold a wide variety of batteries, including standard non-rechargeable ones or non-standard rechargeable ones. It also provides power port 225 for re-chargeable battery use. It is therefore more flexible and economic to use.

4. The casing of the battery packet 26 may be formed in many different shapes desired. It may have a slot opening 2623 or 2623a to receive batteries directly without opening the case. It may also be made without slot opening to suit an electronic device desired. This versatility offers great design flexibility for low cost, better protection, user friendliness, and functionality to suit different devices.

5. The battery packet 26 is located in a lateral side of the electronic device and may be made compact, thin and small size to make the design and structure of the device body easier and more flexible.

It may thus be seen that the objects of the present invention set forth herein, as well as those made apparent from the foregoing description, are efficiently attained. While the preferred embodiments of the invention have been set forth for purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A battery packet for a hand held electronic device comprising:

a) elongated first and second cases attached together bounding an interior space, the cases having a plurality of elongated sides;

b) at least one battery located in the interior space;

c) a plurality of electrical contacts located on a first of the plurality of elongated sides; and, d) an elongated slot opening extending through a second of the plurality of elongated sides, the elongated slot opening extending about one-half of the length of the second elongated side, the elongated slot opening configured so as to enable the at least one battery to be inserted into the interior space through the elongated slot opening.

2. The battery packet of claim 1 wherein the first case has a latching flange and the second case has a latching groove engaged by the latching flange to releasably attach the first and second cases together.

3. The battery packet of claim 1 wherein the first and second cases are non-releasably attached together.

4. The battery packet of claim 1 further comprising a plurality of latch claws extending into the elongated slot opening.

5. The battery packet of claim 1 wherein the elongated slot opening extends along the entire length of the second elongated side.

* * * * *